United States Patent [19]
Minowa et al.

[11] Patent Number: 5,124,813
[45] Date of Patent: Jun. 23, 1992

[54] FACSIMILE APPARATUS

[75] Inventors: Takehiko Minowa; Akihiko Shigami, both of Hino; Kazuyoshi Shundo, Hachioji; Fumiko Wada, Hino, all of Japan

[73] Assignee: Kabushiki Kaisha Toshiba, Kawasaki, Japan

[21] Appl. No.: 494,530

[22] Filed: Mar. 16, 1990

[30] Foreign Application Priority Data

Mar. 17, 1989 [JP] Japan ................. 1-30493
Apr. 6, 1989 [JP] Japan ................. 1-87338[U]

[51] Int. Cl.⁵ .......................................... H04N 1/00
[52] U.S. Cl. ........................... 358/468; 358/476; 358/442; 358/296
[58] Field of Search ............... 358/468, 476, 497, 442, 358/296

[56] References Cited
U.S. PATENT DOCUMENTS 4,319,282  3/1982  Hartman, Jr. et al. ............ 358/476
4,587,633  5/1986  Wang et al. ....................... 358/403

Primary Examiner—Edward L. Coles, Sr.
Attorney, Agent, or Firm—Finnegan, Henderson, Farabow, Garrett and Dunner

[57] ABSTRACT

A facsimile apparatus of the invention stores received image data in an image memory. A storage space for printing paper or a printing mechanism is omitted from the casing of the apparatus so as to reduce the size of the apparatus by printing an image corresponding to the image data stored in the image memory in the following manner:

(1) performing a printing operation with respect to printing paper supplied from a printing paper supply port formed in the casing, and
(2) performing a printing operation by using an external printer.

8 Claims, 8 Drawing Sheets

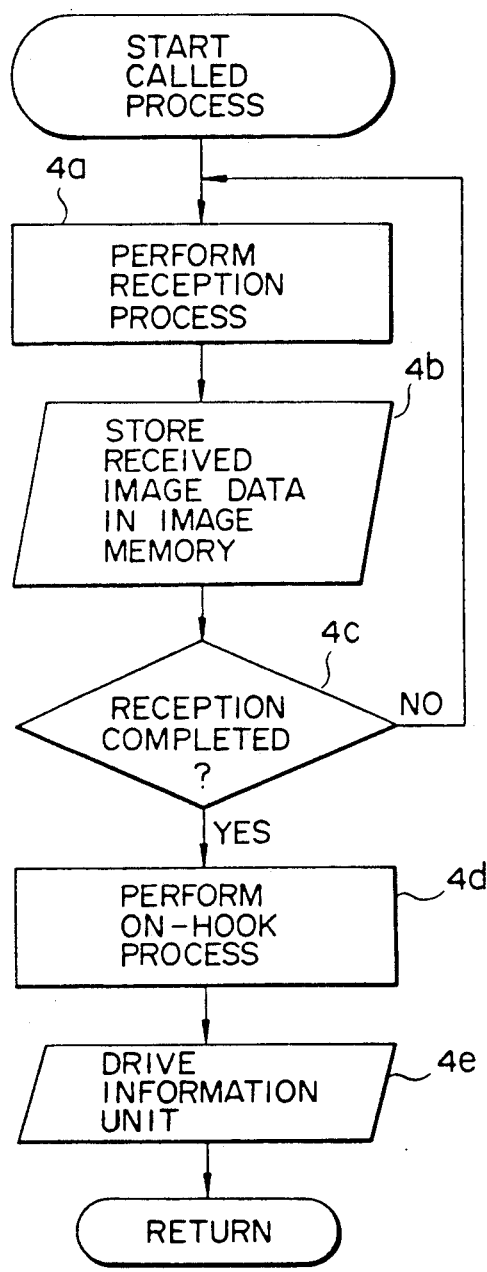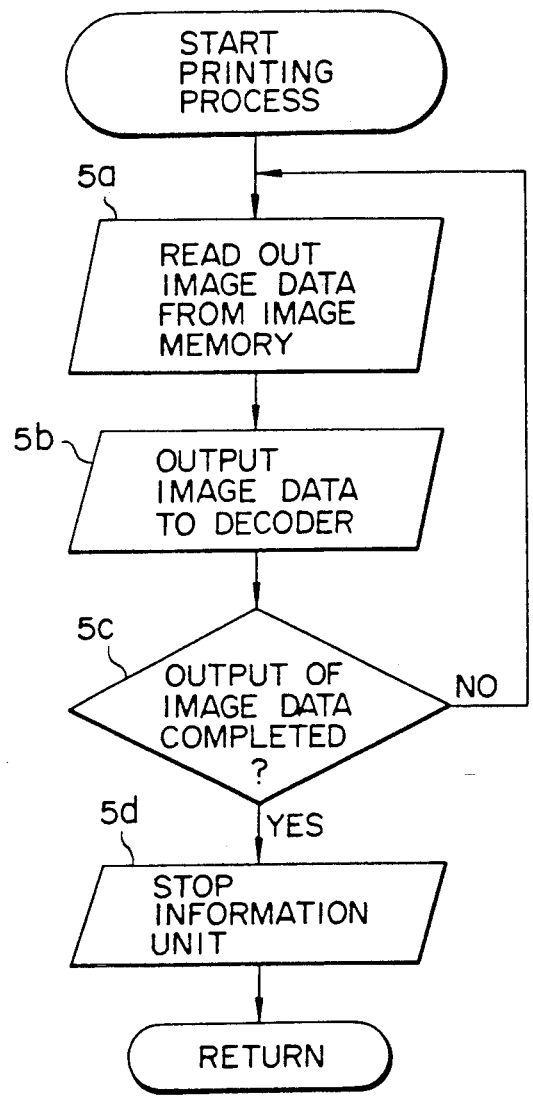
F I G. 4     F I G. 5

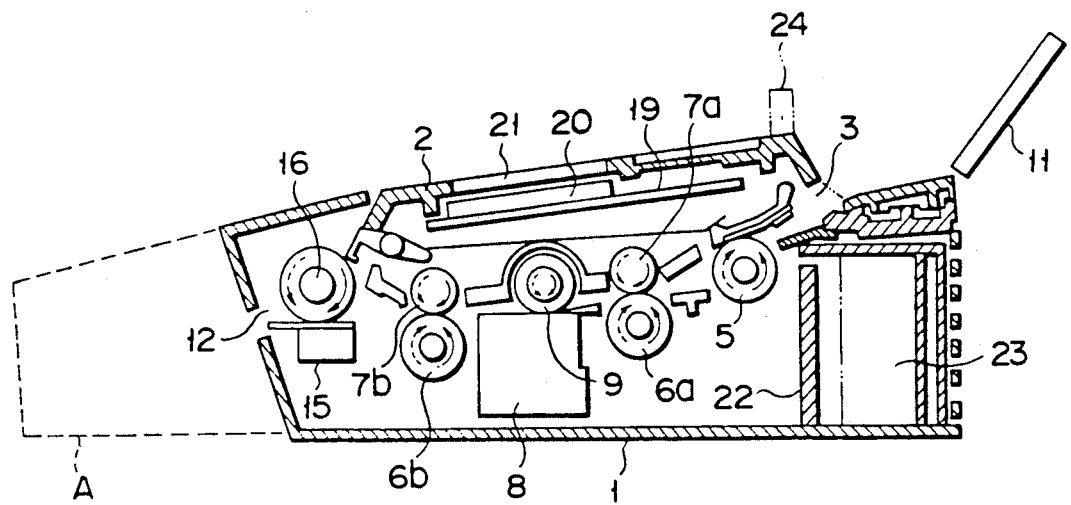
F I G. 6
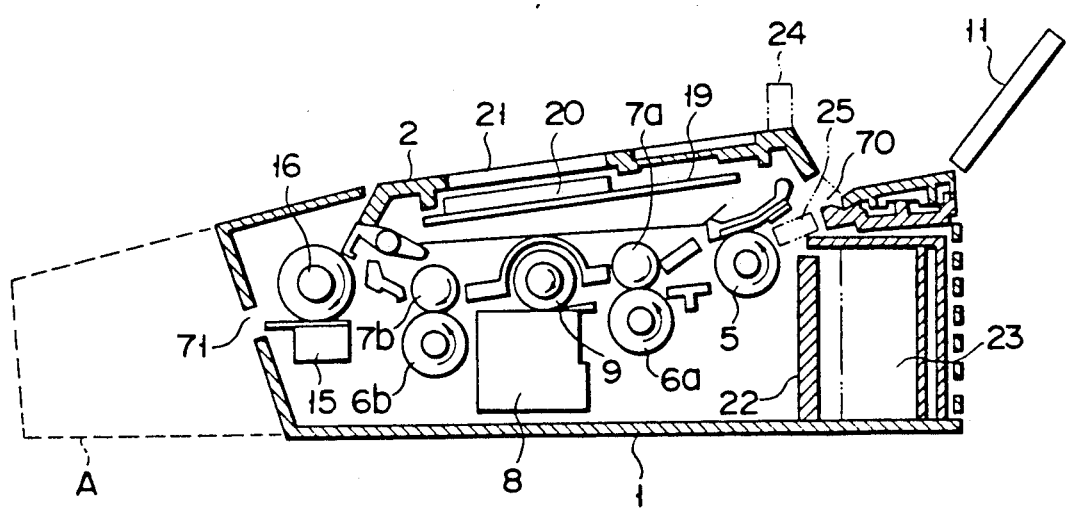
F I G. 7

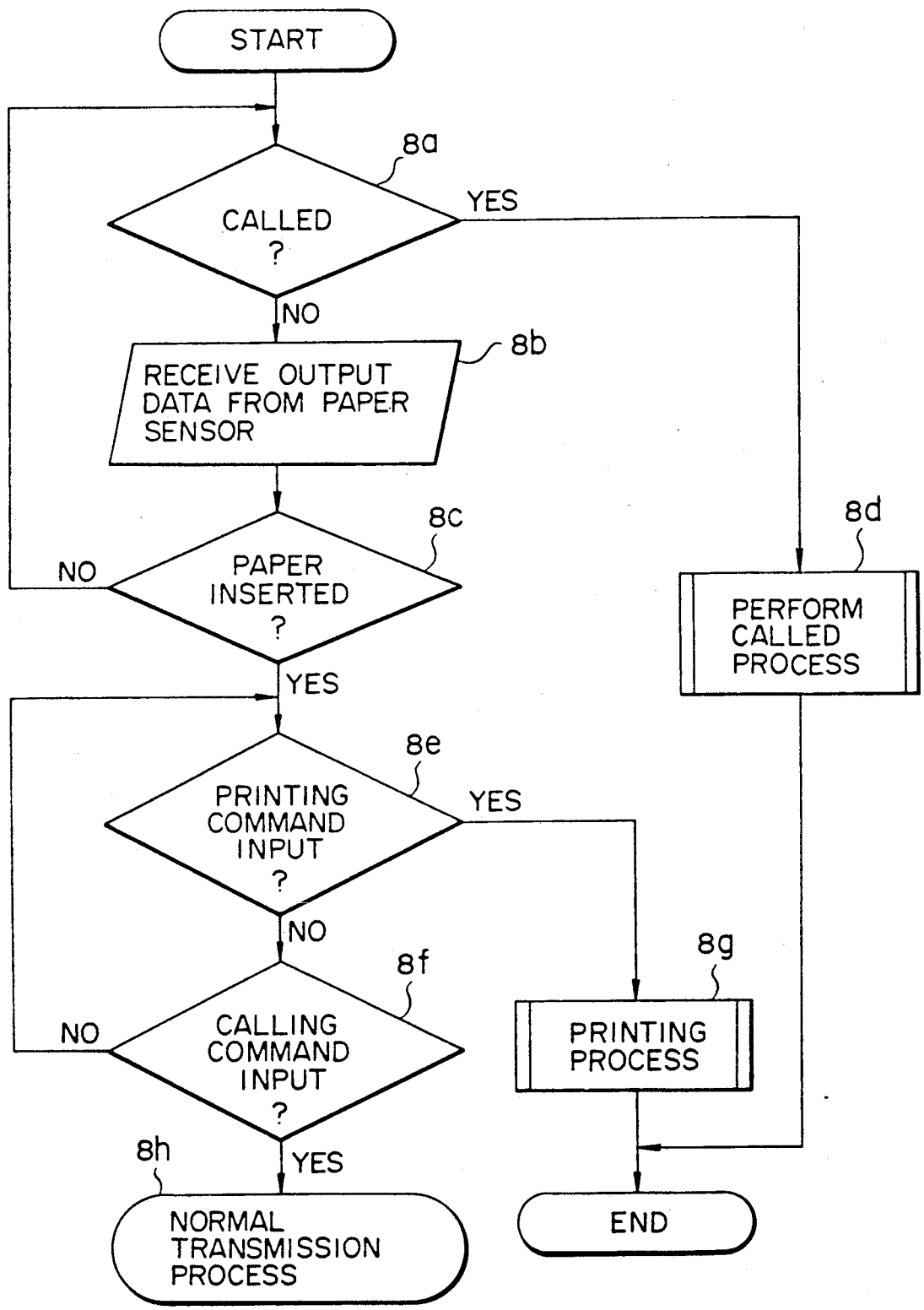
F I G. 8

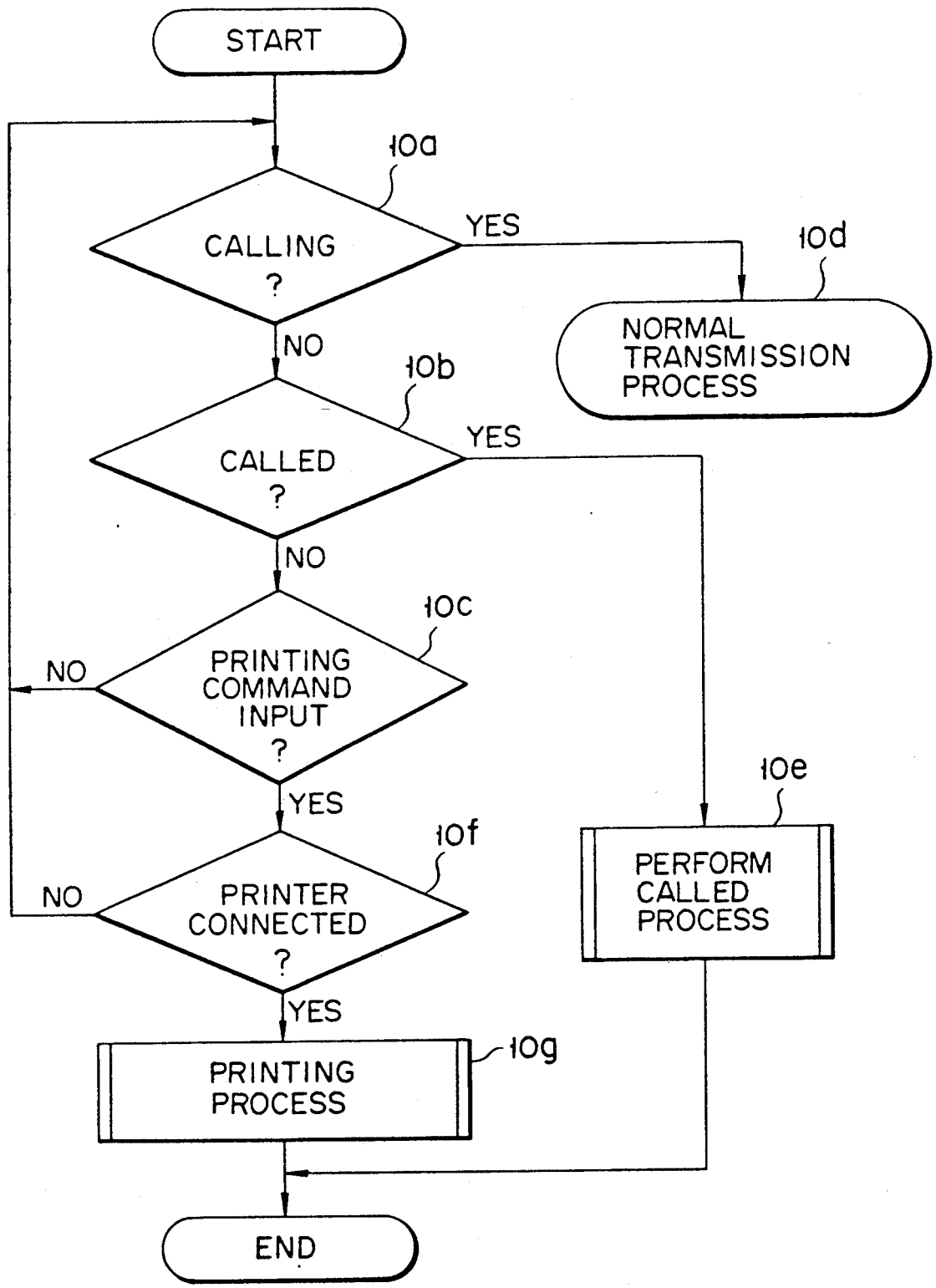
F I G. 10

FACSIMILE APPARATUS

BACKGROUND OF THE INVENTION

1. Field of the Invention

The present invention relate to a facsimile apparatus.

2. Description of the Related Art

A conventional facsimile apparatus for at least receiving an image signal has the following mechanisms as constituent elements: a reception mechanism for receiving an image signal; a printing mechanism for printing an image corresponding to the image signal received by the reception mechanism on printing paper; a printing paper storage mechanism for storing the printing paper; and a printing paper feed mechanism for feeding the printing paper stored by the printing paper storage mechanism to the printing mechanism.

Facsimile apparatuses have recently been used in a variety of ways, and a strong demand has arisen for reducing their size.

Conventional facsimile apparatuses, however, includes various mechanisms as constituent elements, as described above. This imposes limitations on reducing their size.

SUMMARY OF THE INVENTION

It is an object of the present invention to provide a facsimile apparatus which its size to be greatly reduced.

The above object can be achieved by a facsimile apparatus, comprising reception means for receiving an image signal transmitted through a communication circuit connected to the apparatus, storage means, connected to the reception means, for storing the image signal, printing means for printing an image corresponding to the image signal on printing paper, manual printing paper supply means for manually supplying the printing paper to the printing means, printing start designating means for manually designating a start of printing, and printing control means, connected to the printing means and the printing start designating means, for controlling the printing means to print the image corresponding to the image signal stored in the storage means on the printing paper supplied from the manual printing paper supply means in response to the printing start designation performed by the printing start designating means.

The above object can also achieved by a facsimile apparatus, comprising reception means for receiving an image signal transmitted through a communication circuit connected to the apparatus, storage means, connected to the reception means, for storing the image signal, printing means for printing an image corresponding to the image signal on printing paper, information means for providing predetermined information associated with the image signal stored in the storage means, manual printing paper supply means for manually supplying the printing paper to the printing means, printing start designating means for manually designating a start of printing, and printing control means, connected to the printing means and the printing start designating means, for controlling the printing means to print the image corresponding to the image signal stored in the storage means on the printing paper supplied from the manual printing paper supply means in response to the printing start designation performed by the printing start designating means.

The above object can also be achieved by a facsimile apparatus comprising reception means for receiving an image signal transmitted through a communication circuit connected to the apparatus, storage means, connected to the reception means, for storing the image signal, printing means for printing an image corresponding to the image signal on printing paper, read means for reading an image formed on paper, manual paper supply means for manually supplying the paper to the printing means and the read means, paper detecting means, arranged near the manual paper supply means, for detecting the paper supplied from the manual paper supply means, printing start designating means for manually designating a start of printing, read start designating means for manually designating a start of reading, printing control means, connected to the storage means, the paper detecting means, and the printing start designating means, for controlling the printing means to print the image corresponding to the image signal stored in the storage means on the paper supplied from the manual paper supply means in response to printing start designation performed by the printing start designating means while the paper is detected by the paper detecting means, and read control means, connected to the paper detecting means and the read start designating means, for controlling the read means to read the image formed on the paper supplied from the manual paper supply means in response to read the start designation performed by the read start designating means while the paper is detected by the paper detecting means.

The above object can also be achieved by a facsimile apparatus, comprising reception means for receiving an image signal transmitted through a communication circuit connected to the apparatus, storage means, connected to the reception means, for storing the image signal, interface means for connecting an external printing unit with said facsimile apparatus, printing start designating means for manually designating a start of printing, and printing control means, connected to the storage means, the printing start designating means, and the external printing unit, for causing the external printing unit to print an image corresponding to the image signal stored in the storage means in response to the designation of the printing start performed by the printing start designating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a flow chart showing the flow of a called process of the routine of the CPU in the facsimile apparatus shown in FIG. 2;

FIG. 5 is a flow chart showing the flow of a printing process of the routine of the CPU in the facsimile apparatus shown in FIG. 2;

FIG. 6 is a sectional side view showing a mechanical arrangement of a facsimile apparatus according to a second embodiment of the present invention;

FIG. 7 is a sectional side view showing a mechanical arrangement of a facsimile apparatus according to a third embodiment of the present invention;

FIG. 8 is a flow chart showing a routine of a CPU in the facsimile apparatus according to the third embodiment of the present invention;

FIG. 10 is a flow chart showing an operation of a CPU in the facsimile apparatus shown in FIG. 9.

DETAILED DESCRIPTION OF THE PREFERRED EMBODIMENTS

Embodiments of the present invention will be described below with reference to the accompanying drawings.

Figure 1:
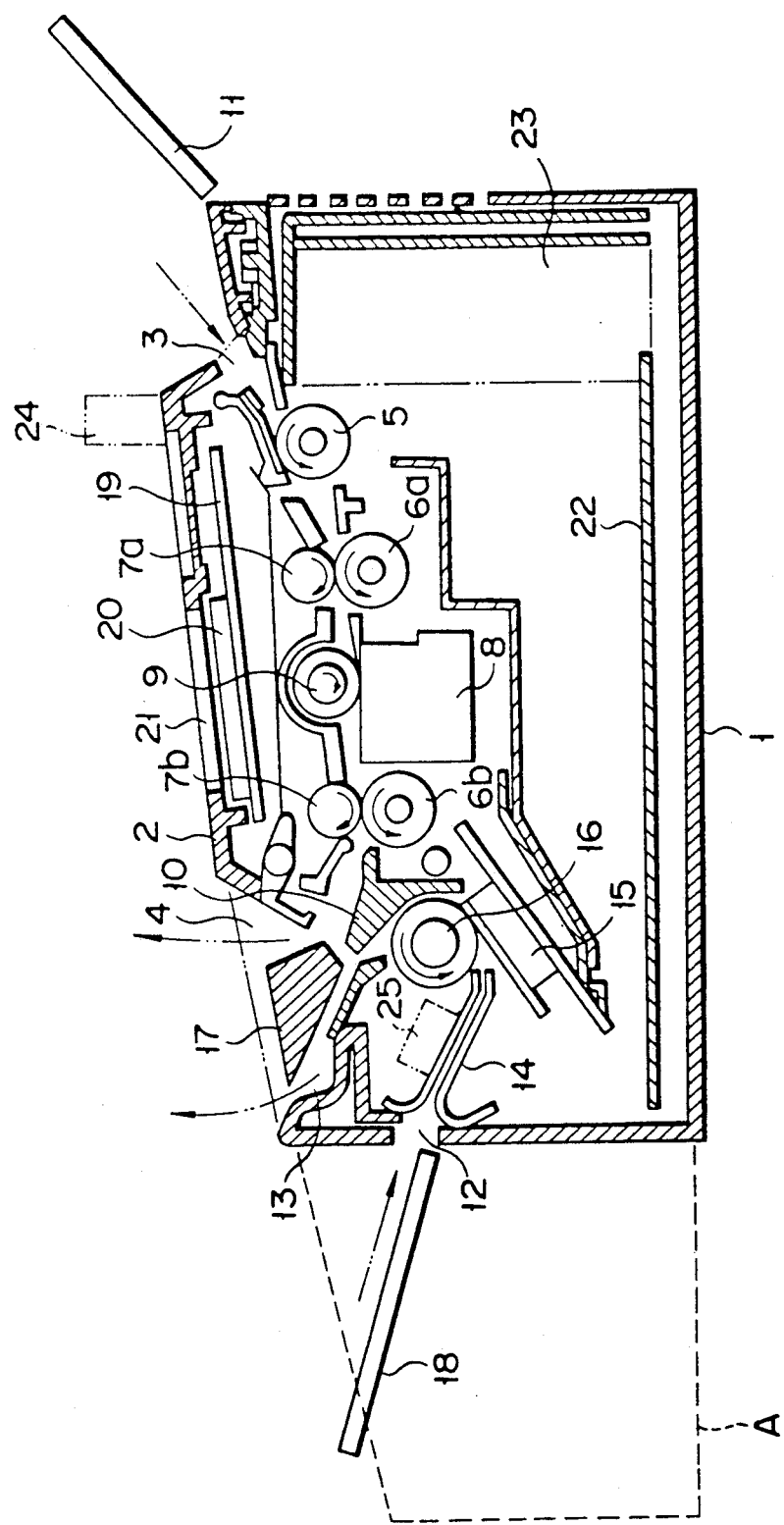
FIG. 1 is a sectional side view showing a mechanical arrangement of a facsimile apparatus according to a first embodiment of the present invention.

FIG. 1 is a sectional side view showing a mechanical arrangement of a facsimile apparatus according to the first embodiment of the present invention.

This facsimile apparatus comprises a casing 1, an operation panel 2, a document inlet 3, a document outlet 4, a feed roller 5, driving rollers 6a and 6b, pinch rollers 7a and 7b, an image sensor 8, a back roller 9, a guide 10, a document table 11, a printing paper supply port 12, a printing paper outlet 13, a guide 14, a printing head 15, a platen roller 16, a guide 17, a printing paper tray 18, a board 19, a display unit 20, a display window 21, a circuit board 22, a power source unit 23, an information unit 24, and a paper sensor 25.

The casing 1 has a box-like shape. The operation panel 2, on which operation buttons (not shown), the display window 21, and the like are formed, is arranged at the central portion on the upper surface of the casing 1. The document inlet 3 is formed in one side portion of the upper surface of the casing 1, and the document outlet 4 is formed in the other side portion of the upper surface. The feed roller 5, the pair of the driving roller 6a and the pinch roller 7a, the pair of the image sensor 8 and the back roller 9, and the pair of the driving roller 6b and the pinch roller 7b are arranged in the casing 1 between the document inlet 3 and the document outlet 4 in the order named. A horizontal document path is defined by these components and the guide 10 facing the document outlet 4 of the casing 1.

The printing paper supply port 12 is formed in one side surface of the casing 1. The printing paper outlet 13 is formed abreast of the document outlet 4 in the other side portion of the upper surface of the casing 1. The guide 14, the printing head 15, the platen roller 16, and the guide 17 are arranged in the casing 1 between the printing paper supply port 12 and the printing paper outlet 13. A U-shaped printing paper path is defined by a combination of these components and the guide 10. The paper sensor 25 constituted by, e.g., a microswitch or a photointerrupter, is arranged in the guide 14 so as to detect printing paper supplied from the printing paper supply port 12.

The display unit 20 supported by the board 19 is arranged in the casing 1 so as to be stacked on the operation panel 2. The display unit 20 opposes the display window 21 formed in the operation panel 2 and, hence, can be seen from the outside. The display unit 20 displays various data during transmission and reception modes of the facsimile apparatus, respectively. The display unit 20 may be constituted by a liquid crystal display panel, a display panel using light-emitting diodes, or the like.

The circuit board 22 is arranged on the bottom portion of the casing 1. Predetermined circuits including circuits constituting a memory reception section and a control section (to be described later) are formed on the circuit board 22. Reference numeral 23 denotes a power source unit.

In addition, the information unit 24 (an LED in this embodiment) is arranged on the upper surface of the casing 1 so as to signal the reception of an image signal to a user.

A document read operation is performed in the following manner. A document (not shown) placed on the document table 11 is fed by the feed roller 5. The document fed by the feed roller 5 is conveyed by the pairs of the driving roller 6a and the pinch roller 7a and of the driving roller 6b and the pinch roller 7b so as to pass between the image sensor 8 and the back roller 9. At this time, an image formed on the document is read by the image sensor 8. Subsequently, the document is discharged outside the casing 1 from the document outlet 4.

A printing operation is performed in the following manner. Printing paper (not shown), e.g., a cut sheet supplied by an operator from the printing paper supply port 12 is guided by the guide 14 so as to be inserted between the printing head 15 and the platen roller 16. The printing paper is then discharged outside the casing 1 from the printing paper outlet 13 by the platen roller 16 and the guides 10 and 17. At this time, an image is printed on the printing paper by the printing head 15.

Figure 2:
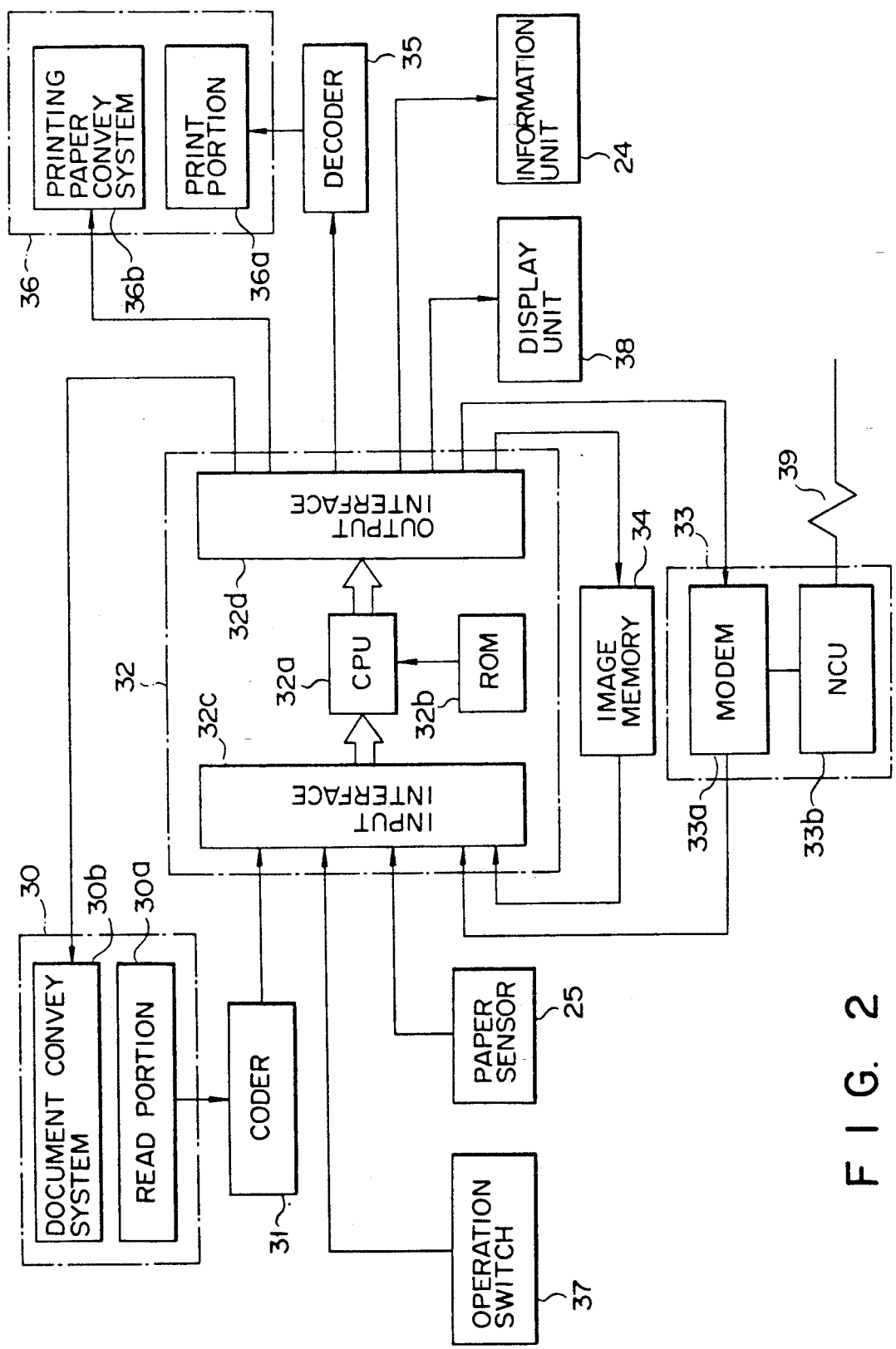
FIG. 2 is a block diagram showing an electrical arrangement of the facsimile apparatus according to the first embodiment of the present invention.

FIG. 2 is a block diagram showing an electrical arrangement of the facsimile apparatus of FIG. 1. The same reference numerals in FIG. 2 denote the same parts as in FIG. 1, and a detailed description thereof will be omitted.

The electrical arrangement of the facsimile apparatus includes a read/scan section 30, a coder 31, a control section 32, a transmission/reception section 33, an image memory 34, a decoder 35, a print/scan section 36, an operation switch 37, and a display unit 38.

The read/scan section 30 includes a read portion 30a and a document convey system 30b. The read portion 30a is constituted by the image sensor 8 (shown in FIG. 1) and a signal processing portion (not shown) for generating an image signal by processing an electrical signal obtained by the image sensor 8. The read portion 30a reads an image formed on a document and generates an image signal corresponding to the image. The document convey system 30b is constituted by the feed roller 5 (shown in FIG. 1), the driving rollers 6a and 6b (shown in FIG. 1), a motor (not shown) for rotating/driving the feed roller 5 and the driving rollers 6a and 6b, and a rotation control circuit (not shown) for controlling the motor. The document convey system 30b conveys a document to be read by the read portion 30a.

The coder 31 codes the image signal generated by the read portion 30a so as to obtain image data. The obtained image data is supplied to the transmission/reception section 33 through the control section 32. The transmission/reception section 33 is constituted by a modem 33a and an NCU 33b. The section 33 modulates the input image data by using the modem 33a and supplies it to a subscriber line 39 through the NCU 33b.

Image data supplied through the subscriber line 39 is received and demodulated by the transmission/reception section 33. The image data is then stored in the image memory 34 under the control of the control section 32.

The decoder 35 decodes the image data supplied from the control section 32 so as to reproduce an image signal, and supplies it to the print/scan section 36. The print/scan section 36 includes a print portion 36a and a printing paper convey system 36b. The print portion 36a is constituted by the printing head 15 (shown in FIG. 1) and a driver (not shown) for driving/controlling the printing head 15. The print portion 36a prints an image corresponding to a supplied image signal on printing paper. The printing paper convey system 36b is constituted by the platen roller 16 (shown in FIG. 1), a motor (not shown) for rotating the platen roller 16, and a rotation control circuit (not shown) for controlling the motor. The convey system 36b conveys printing paper on which an image is printed by the print portion 36a.

The control section 32 comprises a CPU 32a, a ROM 32b, an input interface 32c, and an output interface 32d. The CPU 32a is operated in accordance with programs stored in the ROM 32b so as to perform control of the overall facsimile apparatus. The input interface 32c is a data input port of the CPU 32a, to which the paper sensor 25, the coder 31, the modem 33a, and the image memory 34 are connected. The output interface 32d is a data output port of the CPU 32a, to which the information unit 24, the document convey system 30b, the decoder 35, and the printing paper convey system 36b are connected.

The operation switch 37 is also connected to the input interface 32c. The operation switch 37 includes dial keys and other function keys and is used by an operator of the facsimile apparatus so as to provide instructions to the CPU 32a. The display unit 38 is also connected to the output interface 32d. The display unit 38 is constituted by, e.g., an LCD (liquid crystal display unit), and serves to display an operation state and the like of the facsimile apparatus.

Figure 3:
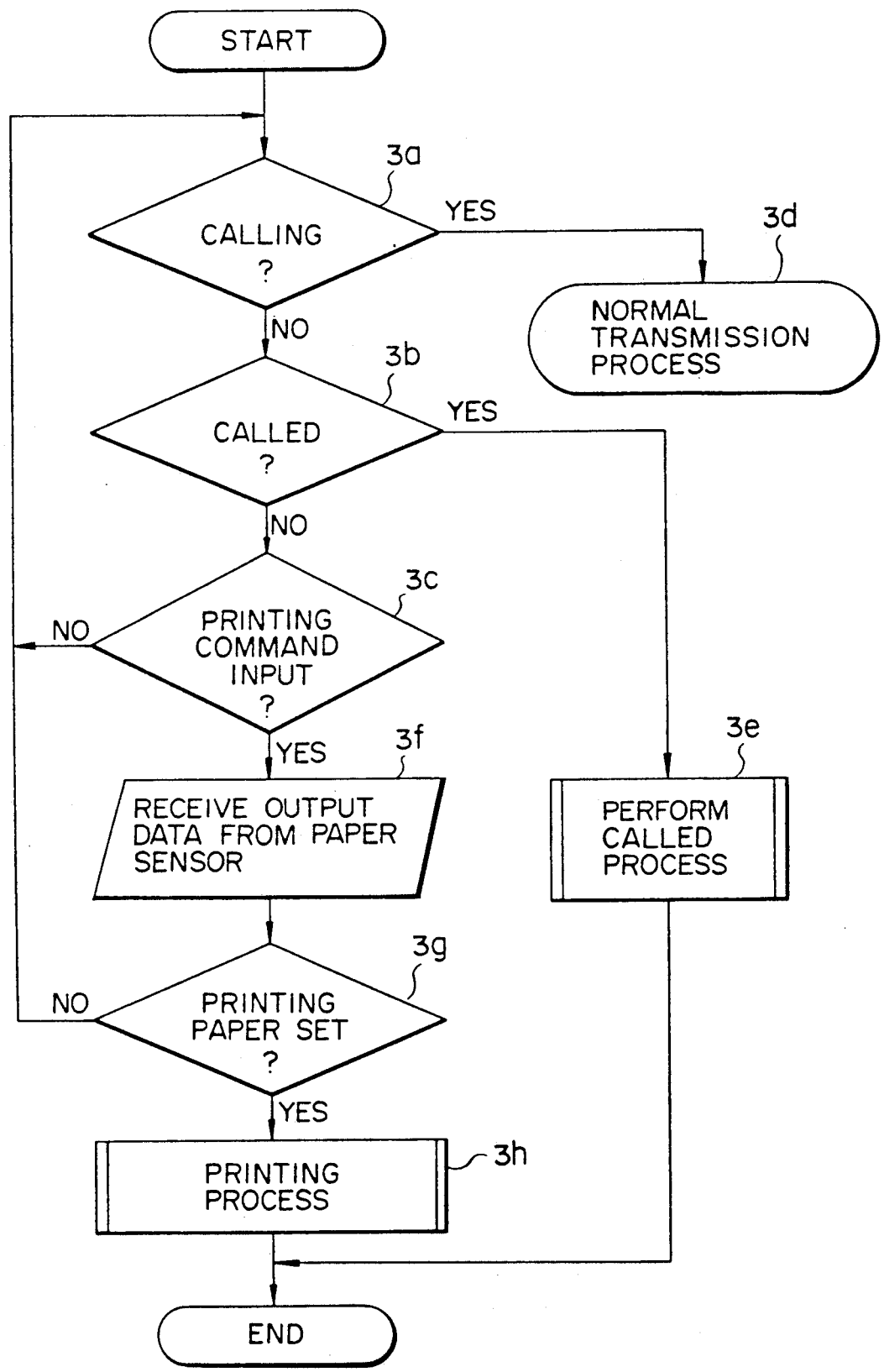
FIG. 3 is a flow chart showing a routine of a CPU in the facsimile apparatus shown in FIG. 2.

Operation of the facsimile apparatus having the above-described arrangement will be described below in accordance with a routine of the CPU 32a. As shown in FIG. 3, in steps 3a and 3b, in a stand-by state, the CPU 32a monitors whether the apparatus is being called and whether it is calling, and monitors the presence/absence of a printing instruction in step 3c.

If a calling instruction is input from the operation switch 37 in this stand-by state, the CPU 32a determines in step 3a that the apparatus is calling. Then, the CPU 32a shifts the flow of processing from step 3a to step 3d so as to perform a known, general transmission processing.

If a call is transmitted through the subscriber line 39 in the stand-by state, the CPU 32a that the apparatus is being called in step 3b. Then, the CPU 32a shifts the flow of processing from step 3b to step 3e. In step 3e, the CPU 32a performs called processing in the following manner. As shown in FIG. 4, the CPU 32a performs reception processing, e.g., a communication procedure or reception of image data in accordance with a predetermined procedure in step 4a, and stores the received image data in the image memory 34 in step 4b. In step 4c, the CPU 32a checks whether the reception processing is completed. The processing in steps 4a and 4b is repeated until the reception processing is completed. If YES in step 4c, the CPU 32a shifts the flow of processing from step 4c to step 4d so as to perform on-hook processing in accordance with a known procedure. In step 4e, the CPU 32a drives the information unit 24, i.e., turns on the LED, and subsequently returns the flow of processing to the main routine shown in FIG. 3, thus completing the processing.

Returning to FIG. 3, if a printing instruction is input from the operation switch 37 in the stand-by state, the CPU 32a detects the printing instruction in step 3c. Then, the CPU 32a shifts the flow of processing from step 3c to step 3f. In step 3f, the CPU 32a receives output data from the paper sensor 25. In step 3g, the CPU 32a checks on the basis of the output data from the paper sensor, which is obtained in step 3f, whether printing paper is supplied to the printing paper supply port 12. If NO in step 3g, the CPU 32a shifts the flow of processing from step 3g to step 3a, and returns to the stand-by state. In this case, the CPU 32a may cause the display unit 38 to display the absence of printing paper as needed.

If YES in step 3g, the CPU 32a shifts the flow of processing from step 3g to step 3h. In step 3h, the CPU 32a performs a printing process in the following manner. As shown in FIG. 5, the CPU 32a reads out image data from the image memory 34 in step 5a, and outputs it to the decoder 35 in step 5b. The image data output from the CPU 32a to the decoder 35 is decoded by the decoder 35 to be reproduced as an image signal. The image signal is then supplied to the print portion 36a. In the print portion 36a, an image corresponding to the supplied image signal is printed on the printing paper supplied from the printing paper supply port 12. In step 5c, the CPU 32a checks whether an operation of outputting all the data stored in the image memory 34 to the decoder 35 is completed, and repeats the processing in steps 5a and 5b until the output operation is completed. If YES in step 5c, the CPU 32a shifts the flow of processing from step 5c to step 5d. In step 5d, the CPU 32a stops driving the information unit 24, i.e., turns off the LED, and subsequently returns the flow of processing to the main routine shown in FIG. 3, thus completing the processing.

In the facsimile apparatus of this embodiment, received image data is stored in the image memory 34. When a printing instruction is input while printing paper is supplied from the printing paper supply port 12, an image corresponding to an image signal obtained by decoding the image data stored in the image memory 34 using the decoder 35 is printed, by the print portion 36a, on the printing paper supplied from the printing paper supply port 12. For this reason, printing paper need not be stored in the casing 1, and a storage section for storing printing paper is not required. Therefore, the casing 1 can be reduced in size by an amount corresponding to a space required for a printing paper storage section (e.g., a portion indicated by a dotted line A in FIG. 1). That is, the casing 1 is very compact as compared with a conventional facsimile apparatus having a space for storing a roll of printing paper (e.g., the portion indicated by the dotted line A in FIG. 1).

Furthermore, in the facsimile apparatus of this embodiment, since the information unit 24 constituted by the LED is turned on from the time when received image data is stored in the image memory 34 to the time when an image corresponding to the image data stored in the image memory 34 is printed, an operator of the facsimile apparatus can easily know whether image data is stored in the image memory 34 by simply looking at the LED. If image data is stored in the image memory 34, the operator can quickly provide a printing instruction for printing an image corresponding to the image data.

Various modifications of the above-described embodiment can be made as follows. In the embodiment, an LED is exemplified as the information unit 24. As the information unit 24, a lamp other than an LED, a sound generator such as a buzzer or a sound synthesizer, a display unit such as an LCD, or the like may be used. Alternatively, the display unit 38 may also have the function of the alarm unit 24. In addition, the print portion 36a may also serve to print, on printing paper supplied from the printing paper supply port 12, an image representing that image data is stored in the image memory 34.

In the above embodiment, the information unit 24 is designed to provide the operator with other information as to whether image data is stored in the image memory 34. However, the information unit 24 may be designed to additionally provide the operator with other information associated with image data stored in the image memory 34, e.g., the number of sheets of printing paper corresponding to received image data and the times of reception.

In addition, the information unit 24 and the paper sensor 25 are not always required, and hence may be omitted.

Moreover, in the above embodiment, an image corresponding to image data stored in the image memory 34 is printed in response to a printing instruction from the operation switch. However, printing may be started in response to a supply operation of printing paper from the printing paper supply port 12 as a printing instruction. In this case, the routine of the CPU 32a shown in FIG. 3 is changed as follows. The processing in step 3c is omitted, and the processing in steps 3a, 3b, 3f, and 3g is performed in the stand-by state. Therefore, when an operator supplies printing paper from the printing paper supply port 12, the printing process in step 3h is performed. With this arrangement, the operation of the operator can be simplified.

In addition to this, various changes and modifications can be made within the spirit and scope of the invention.

The second embodiment of the present invention will be described below.

FIG. 6 is a sectional side view showing a mechanical arrangement of a facsimile apparatus according to the second embodiment of the present invention. The same reference numerals in FIG. 6 denote the same parts as in FIG. 1, and a detailed description thereof will be omitted.

In this embodiment, a single path is commonly used as the printing paper and document paths of the facsimile apparatus shown in FIG. 1. As shown in FIG. 6, therefore, a portion corresponding to the document inlet 3 of the facsimile apparatus shown in FIG. 1 is also used as a printing paper outlet. In addition, a portion corresponding to the printing paper supply port 12 is also used as a document outlet. A feed roller 5, a pair of a driving roller 6a and a pinch roller 7a, a pair of an image sensor 8 and a back roller 9, a pair of a driving roller 6b and a pinch roller 7b, and a pair of a printing head 15 and a platen roller 16 are arranged in a casing 1 between a document inlet 3 and a printing paper supply port 12 in the order named. The facsimile apparatus of this embodiment has the same electrical arrangement and control routine as that of the facsimile apparatus of the first embodiment.

In the facsimile apparatus having the above-described arrangement, the feed roller 5, the driving rollers 6a and 6b, the pinch rollers 7a and 7b, and the platen roller 16 are rotated in a direction indicated by a solid arrow in FIG. 6 during a document read operation, and are rotated in a direction indicated by a dotted arrow in FIG. 6 during a printing operation.

In the read mode, therefore, a document fed from the document inlet 3 is guided into the casing 1 by the feed roller 5. The document is then conveyed by the pair of the driving roller 6a and the pinch roller 7a, the back roller 9, the pair of the driving roller 6b and the pinch roller 7b, and the platen roller 16, and is discharged outside the casing 1 from the printing paper supply port 12. At this time, an image formed on the document is read by the image sensor 8. Note that the printing head 15 is not driven in this case.

In the printing mode, printing paper supplied from the printing paper supply port 12 is guided into the casing 1 by the platen roller 16. The printing paper is then conveyed by the pair of the driving roller 6b and the pinch roller 7b, the back roller 9, and the pair of the driving roller 6a and the pinch roller 7a, and is discharged outside the casing 1 from the document inlet 3. At this time, an image is recorded on the printing paper by the printing head 15. Note that the image sensor 8 is not driven in this case.

In the facsimile apparatus of this embodiment, therefore, similar to the first embodiment, the casing 1 can be reduced in size by an amount corresponding to a space required for a printing paper storage portion (e.g., the portion indicated by the dotted line A in FIG. 1). That is, the casing 1 is very compact as compared with the conventional facsimile apparatus including a space for storing a roll of printing paper (e.g., a portion indicated by a dotted line A in FIG. 6).

Furthermore, in the facsimile apparatus of this embodiment, since a single path is commonly used as a document path and a printing paper path, the guides and the like in the facsimile apparatus of the first embodiment can be omitted, and the size of the apparatus can be further reduced as compared with the facsimile apparatus of the first embodiment in which the document and printing paper paths are separately arranged.

The third embodiment of the present invention will be described below.

FIG. 7 is a sectional side view showing a mechanical arrangement of a facsimile apparatus according to the third embodiment of the present invention. The same reference numerals in FIG. 7 denote the same parts as in FIG. 1, and a detailed description thereof will be omitted.

A paper inlet 70 is formed in one side portion of the upper surface of a casing 1, and a paper outlet 71 is formed in the other side portion of the upper surface. A feed roller 5, a pair of a driving roller 6a and a pinch roller 7a, a pair of an image sensor 8 and a back roller 9, a pair of a driving roller 6b and a pinch roller 7b, and a pair of a printing head 15 and a platen roller 16 are arranged in the casing 1 between the paper inlet 70 and the paper outlet 71 in the order named, thereby forming a document and printing paper path. That is, the facsimile apparatus of this embodiment has substantially the same arrangement as that of the facsimile apparatus of the second embodiment. In this embodiment, however, a document and printing paper are fed from the same paper inlet 70, and a paper sensor 72 is arranged near the paper inlet 70 in the casing 1 so as to oppose the paper path.

The facsimile apparatus of this embodiment has the same electrical arrangement as that of the facsimile apparatus of the first embodiment shown in FIG. 2.

An operation of a CPU 32a of the facsimile apparatus having the above-described arrangement will be described below in accordance with a routine of the CPU 32a. As shown in FIG. 8, in a stand-by state, the CPU 32a monitors whether the operator is being called in step 8a. The CPU 32a receives output data from the paper sensor 72 in step 3b, and checks, on the basis of this data, whether paper is fed to the paper inlet 70.

If a call is transmitted through a telephone circuit in this stand-by state, the CPU 32a detects the call in step 8a. Then, the CPU 32a shifts the flow of processing from step 8a to step 8d. In step 8d, the CPU 32a performs a called process. FIG. 4 shows the routine of this called process.

If printing paper or a document is fed from the paper inlet 70 in the stand-by state, the CPU 32a determines in step 8c that paper is inserted. Then, the CPU 32a shifts the flow of processing from step 8c to step 8e. In step 8e and the next step 8f, the CPU 32a repeatedly checks whether a printing instruction and a calling instruction are input. That is, the CPU 32a waits for a printing instruction and a calling instruction in steps 8e and 8f.

If a printing instruction is input from an operation switch 37, the CPU 32a detects the printing instruction in step 8e. Then, the CPU 32a shifts the flow of processing from step 8e to step 8g. In step 8g, the CPU 32a performs a printing process. FIG. 5 shows the routine of this printing process.

If a calling instruction is input from the operation switch 37 while the CPU 32a is waiting for a printing instruction and an outgoing instruction in steps 8e and 8f, the CPU 32a detects the calling instruction in step 8f. Then, the CPU 32a shifts the flow of processing from step 8f to step 8h. In step 8h, the CPU 32a performs a known, general transmission processing.

In the facsimile apparatus of this embodiment, similar to the second embodiment, a signal path is commonly used as document and printing paper paths. Therefore, the guides and the like in the facsimile apparatus of the first embodiment, in which the document and printing paths are separately formed, can be omitted, and the size of the apparatus of this embodiment can be further reduced as compared with the facsimile apparatus of the first embodiment.

Furthermore, in the facsimile apparatus of this embodiment, since a document and printing paper can be fed from the same paper inlet 50, operability is improved as compared with the facsimile apparatus of the second embodiment, in which a document and printing paper are fed from different inlets.

The fourth embodiment of the present invention will be described below.

Figure 9:
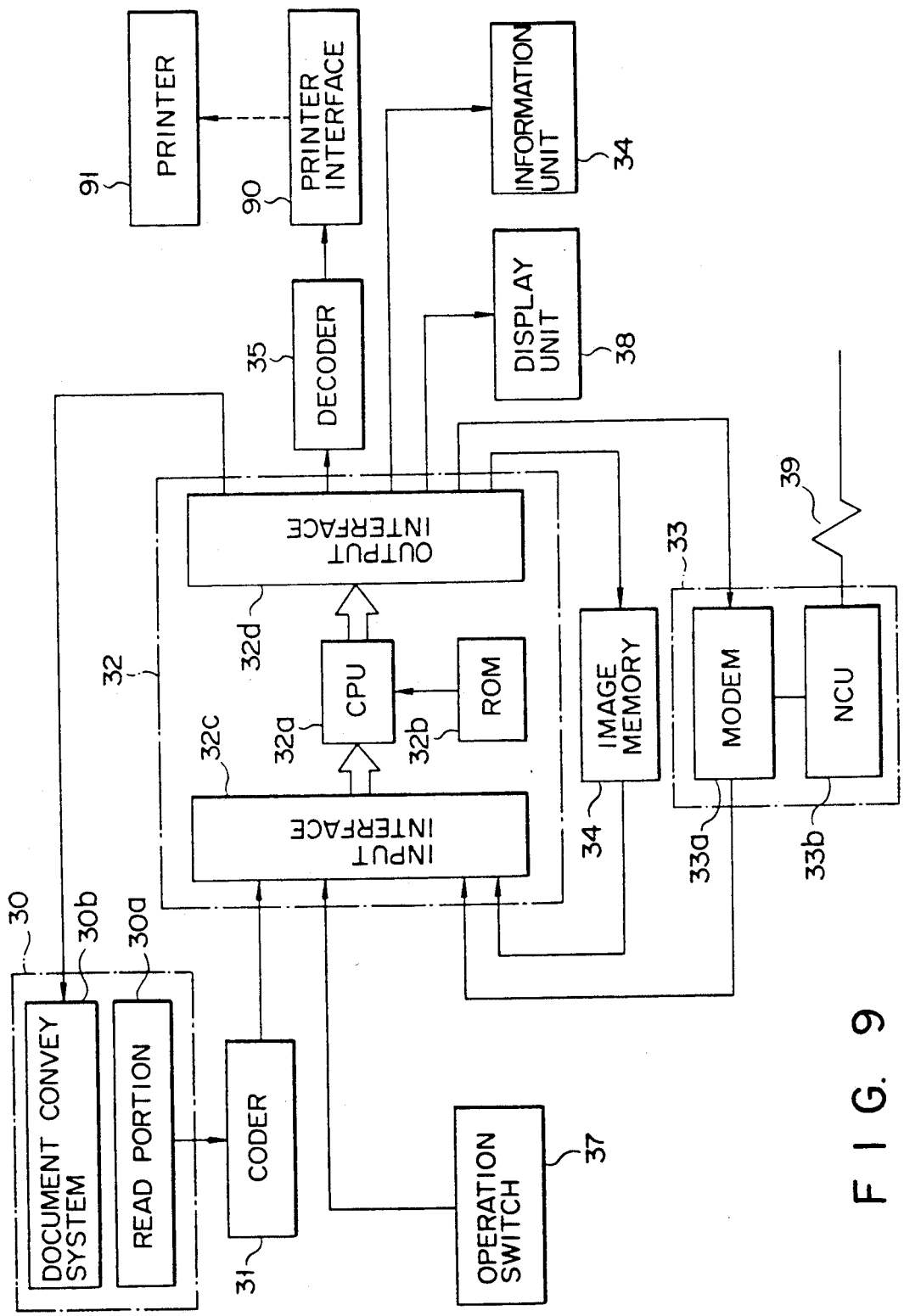
FIG. 9 is a block diagram showing an electrical arrangement of a facsimile apparatus according to a fourth embodiment of the present invention.

FIG. 9 is a block diagram showing an electrical arrangement of a facsimile apparatus according to the fourth embodiment of the present invention. The same reference numerals in FIG. 9 denote the same parts as in FIG. 2, and a detailed description thereof will be omitted.

A characteristic feature of this embodiment is that the print/scan section 36 of the facsimile apparatus of the first embodiment is omitted, and a printer interface 90 is connected to a decoder 35. The printer interface 90 serves to connect an external printer 91, such as a normal printer for a personal computer or the like or a detachable, exclusive printer, to the apparatus.

An operation of the facsimile apparatus having the above-described arrangement will be described below in accordance with a routine of a CPU 32a. As shown in FIG. 10, in a stand-by state, the CPU 32a monitors whether the apparatus is calling and whether the apparatus is being called in steps 10a and 10b. In step 10c, the CPU 32a monitors the presence/absence of a printing instruction.

If a calling instruction is input from an operation switch 37 in this stand-by state, the CPU 32a determines in step 10a that the apparatus is calling. Then, the CPU 32a shifts the flow of processing from step 10a to step 10d. In step 10d, known, general transmission processing is performed.

If a call is transmitted through a telephone circuit in the stand-by state, the CPU 32a detects the call in step 10b. The CPU 32a shifts the flow of processing from step 10b to step 10e. In step 10e, the CPU 32a performs a called process. FIG. 4 shows the routine of this called process. After the incoming processing in step 10e, the CPU 32a complete the processing.

If a printing instruction is input from the operation switch 37 in the stand-by state, the CPU 32a detects the printing instruction in step 10c. Then, the CPU 32a shifts the flow of processing from step 10c to step 10f. In step 10f, the CPU 32a checks whether the printer 91 is connected to the printer interface 90. That is, if the printing instruction is input from the operation switch 37 in the stand-by state, the CPU 32a checks whether the printer 91 is connected to the printer interface 90.

If NO in step 10f, the CPU 32a shifts the flow of processing from step 10f to step 10a so as to return to the stand-by state. In this case, the CPU 32a may cause a display unit 38 to display, as needed, that the printer is not connected.

If YES in step 10f, the CPU 32a shifts the flow of processing from step 10f to step 10g. In step 10g, the CPU 32a performs a printing process. FIG. 5 shows the routine of the printing process. After the printing processing in step 10g, the CPU 32a complete the processing.

In the facsimile apparatus of this embodiment, if a printing instruction is input from the operation switch 37 while the printer 91 is connected to the printer interface 90, image data is read out from an image memory 34, and the read image data is output to a decoder 35. The image data output to the decoder 35 is then decoded by the decoder 35 so as to be reproduced as an image signal. The reproduced image signal is input to the printer 91 through the printer interface 90. The printer 91 prints an image corresponding to the input image signal on set printing paper.

As described above, according to the facsimile apparatus, image printing can be performed by using the external printer 91. Therefore, in addition to the omission of space for storing printing paper as in the facsimile apparatus of the first embodiment, the print/scan section 36 including the guide 14, the printing head 15, the platen roller 16, and the guide 17 in the facsimile apparatus of the first embodiment can be omitted. Hence, a great reduction in size of the apparatus can be realized.

With this arrangement, the facsimile apparatus can be used in a variety of ways. For example, the apparatus can be carried around and used, or can be used in combination with a mobile ratio so as to perform communication from an arbitrary place in the process of moving to a certain place. That is, the range of usage the apparatus can be expanded.

In addition, since no print/scan section is incorporated, the cost of the apparatus can be reduced. If a user already has a printer for a personal computer or the like, the printer can be used for the facsimile apparatus, thus allowing effective use of the equipment.

Various modifications of the above-described embodiment can be made as follows. In the above embodiment, received image data is stored in the image memory 34, and an image corresponding to the image data stored in the image memory 34 is printed by the printer 91 in response to a printing instruction. However, if facsimile reception processing is to be performed while the external printer 91 is connected, image printing may be performed in real time. Furthermore, in the above embodiment, all the data stored in the image memory 34 is printed and output in response to a printing instruction. However, this processing may be performed in units of documents (communication processes). Various other changes and modifications can be made within the spirit and scope of the invention.

Moreover, if the apparatus is exclusively designed for reception by omitting the read/scan section 36, its size can be further reduced. Various other changes and modifications can be made within the spirit and scope of the invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A facsimile apparatus to be connected to a communication circuit, comprising:
    reception means for receiving an image signal transmitted through the communication circuit;
    storage means, connected to said reception means, for storing the image signal;
    printing means for printing an image corresponding to the image signal on printing paper;
    manual printing paper supply means for manually supplying the printing paper to said printing means;
    printing start designating means for manually designating a start of printing; and
    printing control means, connected to said printing means and said printing start designating means, for controlling said printing means to print the image corresponding to the image signal stored in said storage means on the printing paper supplied from said manual printing paper supply means in response to printing start designation performed by said printing start designating means.

2. An apparatus according to claim 1, wherein said printing start designating means comprises a sensor, arranged near said manual printing paper supply means, for detecting printing paper from said manual printing paper supply means.

3. A facsimile apparatus to be connected to a communication circuit, comprising:
    reception means for receiving an image signal transmitted through the communication circuit;
    storage means, connected to said reception means, for storing the image signal;
    printing means for printing an image corresponding to the image signal on printing paper;
    information means for providing predetermined information associated with the image signal stored in said storage means;
    manual printing paper supply means for manually supplying the printing paper to said printing means;
    printing start designating means for manually designating a start of printing; and
    printing control means, connected to said printing means and said printing start designating means, for controlling said printing means to print the image corresponding to the image signal stored in said storage means on the printing paper supplied from said manual printing paper supply means in response to printing start designation performed by said printing start designating means.

4. An apparatus according to claim 3, wherein said information means comprises display means for performing a visual display.

5. An apparatus according to claim 3, wherein said information means comprises sound generating means for generating a sound.

6. An apparatus according to claim 3, wherein said information means comprises means for causing said printing means to print a predetermined image associated with data to be informed on printing paper supplied from said manual printing paper supply means.

7. An apparatus according to claim 3, wherein said printing start designating means comprises a sensor, arranged near said manual printing paper supply means, for detecting printing paper from said manual printing paper supply means.

8. A facsimile apparatus to be connected to a communication circuit, comprising:
    reception means for receiving an image signal transmitted through the communication circuit;
    storage means, connected to said reception means, for storing the image signal;
    printing means for printing an image corresponding to the image signal on printing paper;
    read means for reading an image formed on paper;
    manual paper supply means for manually supplying the paper to said printing means and said read means;
    paper detecting means, arranged near said manual paper supply means, for detecting the paper supplied from said manual paper supply means;
    start designating means for manually designating a start of printing;
    read start designating means for manually designating a start of reading;
    printing control means, connected to said storage means, said paper detecting means, and said printing start designating means, for controlling said printing means to print the image corresponding to the image signal stored in said storage means on the paper supplied from said manual paper supply means in response to printing start designation performed by said printing start designating means while the paper is detected by said paper detecting means; and read control means, connected to said paper detecting means and said read start designating means, for controlling said read means to read the image formed on the paper supplied from said manual paper feed means in response to read start designation performed by said read start designating means while the paper is detected by said paper detecting means.

* * * * *